Figure 1:
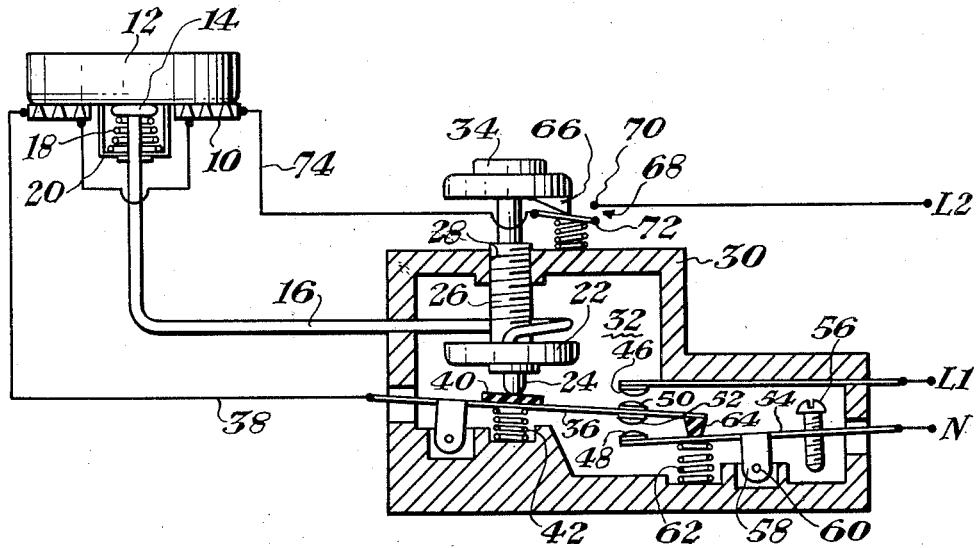

INVENTORS
Victor Weber, Hugh J. Tyler
and William J. Russell.
BY Albert J. Henderson
THEIR ATTORNEY

United States Patent Office 2,833,895
Patented May 6, 1958

2,833,895

TEMPERATURE RESPONSIVE CONTROL

Victor Weber, Greensburg, Hugh J. Tyler, Pittsburgh, and William J. Russell, Jeannette, Pa., assignors to Robertshaw-Fulton Controls Company, Greensburg, Pa., a corporation of Delaware Original application September 8, 1954, Serial No. 454,753. Divided and this application December 14, 1956, Serial No. 628,371

7 Claims. (Cl. 200—140)

This application is a division of our application Serial No. 454,753, filed September 8, 1954. This invention relates to thermostat control devices and more particularly to an improved device which is particularly adapted for controlling the surface heating element of an electric range.

Many foods require rapid initial heating to bring the food to a predetermined temperature and thereafter require a reduced amount of heat input to maintain such predetermined temperature. It is an object of this invention to effect such a cooking operation by permitting the heating element to operate at full energy input until the temperature of the food to be cooked reaches a predetermined value, and then reducing energy input to the heating element to maintain the food at the proper temperature.

Another object of this invention is to incorporate in a thermostatic control device a switching mechanism for reducing energy input to a heating element as the control temperature is approached during an increase in temperature.

Another object of this invention is to reduce the rate of energy input to a heating element by a switching mechanism operative in one position to connect the heating element across a source of reduced voltage.

In the preferred embodiment of the invention, a switch arm is pivotally mounted in a casing and extends between a pair of relatively fixed contacts. The switch arm carries a pair of oppositely disposed contacts which are engageable with the fixed contacts respectively. One of the relatively fixed contacts is mounted on one end of the second switch arm which carries an adjustable stop adjacent its other end and is pivoted intermediate its ends on the casing. Thermally responsive means are provided including an expansible element mounted on said casing and engageable with the first said switch arm. Upon an increase in temperature, the first switch arm will move one of its contacts out of engagement with one of the fixed contacts and move the other of its contacts into engagement with a relatively fixed contact to connect the surface heating element to a source of reduced power. Upon further increase in temperature, an abutment carried by the first switch arm engages the second switch arm to disengage their associated contacts and terminate the supply of power to the heating element.

Figure 2:
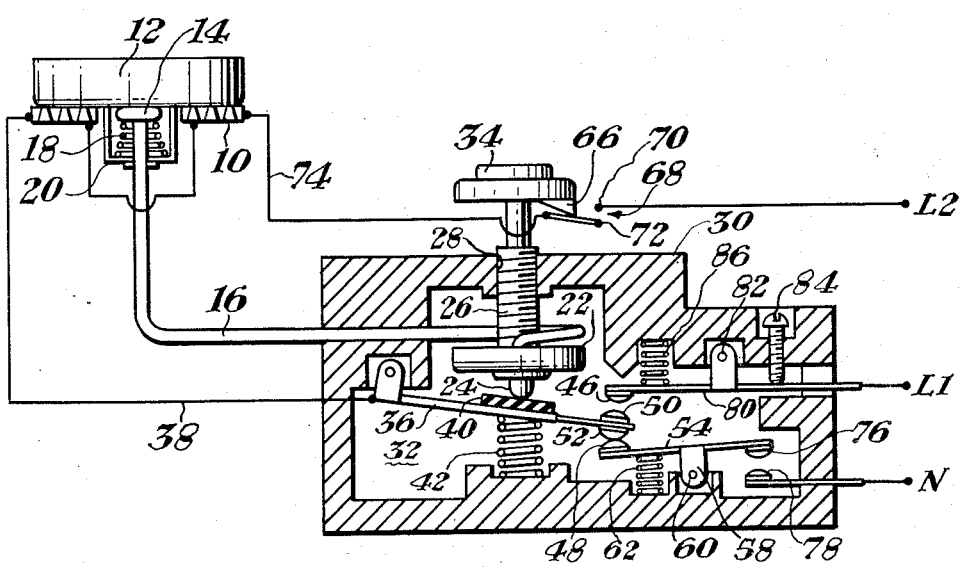

Other objects and advantages will become apparent from the following description taken in connection with the accompanying drawings wherein:

Fig. 1 is a schematic view of the control device embodying this invention and a surface heater for an electric range; and Fig. 2 is a view similar to Fig. 1 but showing a modified form of invention.

Referring more particularly to Fig. 1, there is shown an annular surface heating element 10 which is adapted to be supported on the top plate of an electric range (not shown) in a manner well known in the art. The heating element 10 is adapted to support a cooking vessel 12 thereon and is provided with a temperature sensing bulb 14 which is located centrally thereof.

The bulb 14 takes the form of a flat, hollow container which communicates with a capillary tube 16 and is biased toward the cooking vessel 12 by a spring 18 seated on a suitable stirrup 20. The particular structure of the bulb 14 and mounting therefor is fully disclosed and claimed in our co-pending application Serial No. 454,754, filed September 8, 1954, which is now Patent No. 2,786,930.

The capillary tube 16 also communicates with an expansible power element 22 which may consist of a pair of flexible diaphragms welded together at their periphery and carrying a thrust button 24 on one side thereof. The other side of the power element 22 is secured to a stud 26 which is threaded through a suitable aperture 28 formed in the wall of the casing 30 to mount the power element 22 in a chamber 32 formed in the casing 30.

One end of the stud 26 projects from the casing 30 and carries a manually operable knob or dial 34 which may be manipulated to rotate the stud 26 and thus effect axial adjustment of the power element 22 relative to the casing 30.

The assembly of the bulb 14, capillary tube 16, and expansible power element 22 is filled with a suitable thermal fluid which will expand upon increase in temperature sensed by the bulb 14 to effect expansion of the power element 22.

A switch arm 36 is pivotally mounted in the casing 30 and is connected at one end to a lead wire 38 which in turn is connected to the surface heater 10. The switch arm 36 underlies the expansible power element 22 and carries a block of insulating material 40 which is biased into engagement with the thrust button 24 by a suitable spring 42 acting on the switch arm 36. The other end of the switch arm 36 extends between a pair of contacts 46, 48 and carries a pair of oppositely disposed contacts 50, 52 engageable with the contacts 46, 48, respectively.

The contact 48 is mounted on one end of a second switch arm 54 which carries an adjustable stop in the form of a screw 56 adjacent its other end and is pivoted intermediate its ends on the casing 30 by means of a lug 58 and pin 60. A spring 62 acts between the switch arm 54 and the casing 30 to normally hold the screw 56 seated on the casing 30 and thereby position the contact 48 in predetermined spaced relation with the contact 52. The switch arm 36 extends beyond the contacts 46, 48 and contacts 50, 52 and carries a projection 64 on its extremity which overlies the switch arm 54.

The contact 46 is connected to one line wire L1 of a suitable three-wire source of electric power and the switch arm 54 is connected to a neutral wire N. To provide for an "off" position of the dial 34, this member is provided with suitable cam means 66 which co-act with the normally closed switch 68 to open the same in a selected position of the dial 34. A fixed contact 70 of the switch means 68 is connected to the line wire L2 of the source, and a movable contact 72 is connected to the heating element 10 by a lead wire 74.

As shown, the apparatus of Fig. 1 is in the "off" position with no electrical energy being supplied to the surface heating element 10. To place the apparatus in operation, the dial 34 is rotated to a desired temperature setting. Such rotation of the dial 34 will move the cam means 66 out of engagement with the switch 68 and permit the latter to close. The temperature setting movement of the dial 34 will also serve to screw the stud 26 out of the casing 30 and move the power element 22 upward, thereby permitting the switch arm 36 to pivot under the bias of the spring and move the contact 50 into engagement with the fixed contact 46.

The apparatus is thus conditioned to supply relatively large amounts of electric energy to the surface heating element 10 to a circuit which may be traced as follows: line wire L2 of the three-wire power source, switch 68, wire 74, heating element 10, wire 38, switch arm 36, and contacts 50, 46 and line wire L1. Thus, the surface heating element 10 is connected directly across line wires L1, L2 which may have a potential difference on the order of 230 volts. Accordingly, heat will be generated by the surface heating element 10 at a relatively rapid rate to raise the temperature of the cooking vessel 12 and the food contained therein.

As the temperature of the cooking vessel 12 rises, the temperature of the bulb 14 will increase to cause expansion of the power element 22. Expansion of the power element 22 will move the thrust button 24 into engagement with the switch arm 36 to swing the same against the bias of the spring 42, thereby moving the contact 50 out of engagement with the fixed contact 46 and moving the contact 52 into engagement with the contact 48 after having opened contacts 46, 50.

At this point, the surface heating element 10 is energized through a circuit which may be traced as follows: line wire L2, switch 68, wire 74, heating element 10, wire 38, switch arm 36, contacts 48, 52, switch arm 54 and neutral wire N of the power source. Thus, the heating element 10 is connected directly across line wire L1 and neutral wire N which may have a potential difference on the order of 115 volts. When the apparatus is in this condition, the rate of energy input to the heating element 10 is substantially less than when the same is connected directly across line wires L1, L2. Thus, the heat produced by the heating element 10 and transmitted to the cooking vessel 12 is also substantially less. Heat supplied to the cooking vessel 12 at this reduced rate continues to raise the temperature of the contents thereof gradually to the desired temperature.

As the temperature of the vessel 12 rises as a result of the reduced energy input due to the heating element 10, such temperature rise is sensed by the bulb 14, and consequently, the power element 22 continues to expand. The continued expansion of the power element 22 moves the projection 64 on the switch arm 36 into engagement with the switch arm 54, causing the latter to be pivoted in a counterclockwise direction to move the contact 48 out of engagement with the contact 52. Separation of the contacts 48, 52 will break the last traced energizing circuit for the surface heating element 10 and the supply of heat to the vessel 12 will be terminated.

As the temperature of the vessel 12, as sensed by the bulb 14, drops, the power element 22 will contract to permit the switch arm 36 to move in a counterclockwise direction under the bias of the spring 42. Such movement of the switch arm 36 will raise the projection 64 and permit clockwise movement of the switch arm 54 under the bias of the spring 62 to bring the contact 48 into engagement with the contact 52 and once again complete the circuit for energizing the heating element 10 at a relatively low input rate.

Usually, restoration of the reduced rate of heat input serves to restore the desired temperature to the vessel 12 to again cause expansion of the power element and opening of the contacts 48, 52. However, in the event that the reduced input rate is not sufficient to restore the desired temperature, the power element 22 may contract sufficiently to open the contacts 48, 52 and subsequently close the contacts 46, 50 thereby completing the circuit which provides a relatively high input rate to the heating element 10.

It will be apparent from the foregoing that the apparatus shown in Fig. 1 is operative to bring the temperature of the cooking vessel rapidly up to a temperature approaching the desired control temperature thus applying power at a relatively high rate to the heating element 10 and thereafter effecting a gradual temperature rise in the cooking vessel 12 to the selected cooking temperature by supplying power at a reduced rate to the heating element 10. Subsequent maintenance of the selected temperature of the cooking vessel 12 is effected by supplying power at a high or low rate to the heating element 10 in response to temperature variations of the cooking vessel 12.

The temperature at which the power supplied to the heating element 10 is switched from a high to a low rate is accurately determined by the setting of the dial 34. It will be apparent that the screw 56 carried by the switch arm 54 may be adjusted to position the contact 48 for engagement with the contact 52 after separation of the contacts 46, 50.

The embodiment of the invention shown in Fig. 2, wherein parts corresponding to parts hereinbefore described are given like reference numerals, is similar to the embodiment shown in Fig. 1 but differs therefrom in the form of the switching mechanism for terminating the supply of electric energy to the surface heater 10.

The switch arm 54 of Fig. 2 carries a contact 48 on one end thereof for engagement with the contact 52 but carries a second contact 76 on the other end thereof in place of the adjusting screw 56 shown in Fig. 1. The contact 76 is movable with the switch arm 54 and is engageable with a fixed contact 78 which is connected to the neutral wire N of the three-wire power source.

The contact 46 which is engageable with the contact 50 on the switch arm 36 is carried on a lever 80. The lever 80 is pivotally mounted on the casing 30 by means of a pin 82 and is biased into engagement with an adjusting screw 84 by a spring 86. It will be apparent that the adjusting screw 84 controls the position of the contact 46 relative to the casing 30 and thus may be manipulated to effect proper positioning of the contact 46 relative to the contact 50. This arrangement insures that the contact 52 will not engage the contact 48 until after the contacts 46, 50 have been separated.

Operation of the apparatus shown in Fig. 2 is similar to the operation of that shown in Fig. 1, differing only in that the energizing circuit which supplies energy to the heating element 10 at a relatively low rate, is broken by separation of the contacts 76, 78 rather than by separation of the contacts 48, 52. The contacts 48, 52 are normally held in engagement with each other by the bias of the spring 62 and are moved out of engagement with each other upon excessive expansion of the power element 22 in response to a temperature of the cooking vessel 12 which is higher than the selected control temperature.

While only two embodiments of the invention have been herein shown and described, it will be obvious to those skilled in the art that the invention may be variously embodied and that changes may be made in the construction and arrangement of parts without departing from the scope of the invention as defined in the appended claims.

It is claimed and desired to secure by Letters Patent:

1. A thermostatic control device comprising, a casing, first switch means in said casing having open and closed positions for controlling a first circuit, second switch means in said casing having open and closed positions for controlling a second circuit, means responsive to a temperature condition including a member mounted on said casing and movable in response to a change in the temperature condition, means operatively connected to said member and said first and second switch means for maintaining said first switch means in said closed position and said second switch means in said open position in response to said temperature condition and for sequentially actuating said first switch means from said closed position to said open position and said second switch means from said open position to said closed position in response to an increase in the temperature condition, and means operatively associated with said member and said second switch means for actuating said second switch means to said open position in response to a further increase in the temperature condition.

2. In a thermostatic control device, the combination comprising a casing, first switch means in said casing having open and closed positions for controlling a first circuit, second switch means in said casing having open and closed positions for controlling a second circuit, a pivotal lever operatively associated with said first and second switch means for actuating the same between said positions, means responsive to a temperature condition including a movable element operatively connected to said lever for sequentially actuating said first switch means from said closed position to said open position and said second switch means from said open position to said closed position in response to an increase in the temperature condition, and means including said lever for actuating said second switch means to said open position in response to a further increase in the temperature condition.

3. In a thermostatic control device, the combination comprising a casing, a fixed contact mounted within said casing, a fixed pivotal lever mounted in said casing, a second contact mounted on one end of said lever in spaced relation to said fixed contact, a second pivotal lever mounted in said casing and having contact means thereon for movement into and out of engagement with said fixed and second contacts, means responsive to a temperature condition including an expansible and contractible element mounted on said casing and being engageable with said lever for actuating said second contact means out of engagement with said fixed contact and subsequently into engagement with said second contact upon predetermined expansion of said element and being subsequently operable to automatically actuate said contact means out of engagement with said second contact and subsequently back into engagement with said fixed contact upon a subsequent predetermined contraction of said element, and abutment means carried on said second lever engageable with said fixed lever upon further expansion of said element to pivot said fixed lever relative to said second lever and actuate said second contact out of engagement with said contact means.

4. A thermostatic control device comprising a casing, a pair of pivotal levers mounted in said casing, a pair of mating contacts, one of said contacts being mounted on each of said levers, means for biasing one of said levers to a predetermined position, and means responsive to a temperature condition including an expansible element mounted on said casing and engageable with the other of said levers to actuate the same to close said contacts in response to a predetermined expansion of said element and to rotate said one lever against said bias from said position upon further expansion of said element.

5. A thermostatic control device as claimed in claim 4 wherein a third fixed contact is mounted on said casing in spaced relation to said contact carried by said one lever, and said contact carried by said other lever is moved out of engagement with said third contact and into engagement with said contact of said one lever upon said predetermined expansion of said element.

6. A thermostatic control device as claimed in claim 5 wherein said other lever is provided with an abutment adjacent one end thereof for engagement with said one lever during said further expansion of said element to effect disengagement of said pair of contacts.

7. A thermostatic control device comprising a casing, a pair of pivotal levers mounted in said casing, a pair of mating contacts, one of said contacts being mounted on each of said levers, means for biasing one of said levers to a predetermined position, means responsive to a temperature condition including an expansible element mounted on said casing and engaging the other of said levers to actuate the same to close said contacts in response to a predetermined expansion of said element and to rotate said one lever against said bias upon further expansion of said element, and a second pair of contacts within said casing, one of said second pair being fixed to said casing and the other of said second pair being carried by said one lever in engagement with said fixed contact in said predetermined position of said one lever, said one contact of said second pair being moved out of engagement with said fixed contact by said further expansion of said element.

References Cited in the file of this patent

UNITED STATES PATENTS

| | | |
|---|---|---|
| 2,385,434 | Weber | Sept. 25, 1945 |
| 2,403,824 | Newell | July 9, 1946 |
| 2,441,192 | Graves | May 11, 1948 |
| 2,591,803 | Garner | Apr. 8, 1952 |
| 2,671,136 | Greenawalt | Mar. 2, 1954 |
| 2,715,664 | Garner et al. | Aug. 16, 1955 |
| 2,718,574 | Weber et al. | Sept. 20, 1955 |